D. M. HUNT.
Hand-Cars.

No. 136,652. Patented March 11, 1873.

Witnesses:
Chas. Nida
C. Sedgwick

Inventor:
D. M. Hunt
per
Attorneys.

UNITED STATES PATENT OFFICE.

DANIEL M. HUNT, OF SOUTHAMPTON MILLS, PENNSYLVANIA.

IMPROVEMENT IN HAND-CARS.

Specification forming part of Letters Patent No. 136,652, dated March 11, 1873.

*To all whom it may concern:*

Figure 1:
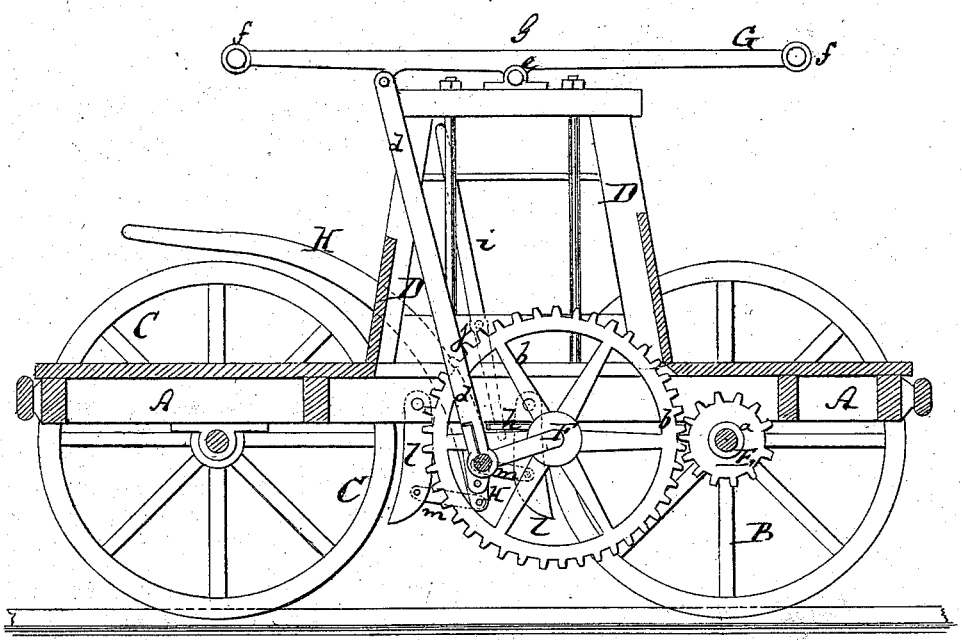
Figure 2:
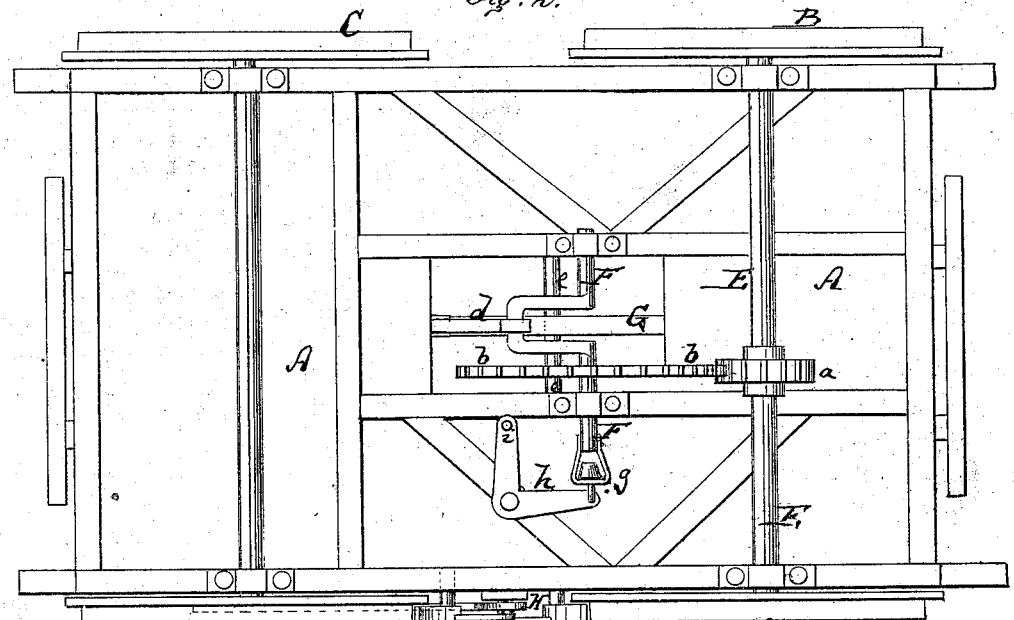

Be it known that I, DANIEL M. HUNT, of Southampton Mills, in the county of Somerset and State of Pennsylvania, have invented a new and Improved Hand-Car, of which the following is a specification:

Figure 1 is a vertical longitudinal section of my improved hand-car. Fig. 2 is a bottom view of the same.

Similar letters of reference indicate corresponding parts.

The invention consists in an improved mode of connecting the hand-lever with the crank-shaft, as hereinafter fully described and claimed.

In the drawing, the letter A represents the frame or truck of the car, supported by wheels B C, and supporting a top frame-work, D. The two wheels B B, at one end, are mounted upon the axle E, which also carries a pinion, a. Into this pinion meshes a toothed wheel, b, which is mounted upon a crank-axle, F, that hangs in the lower part of the frame A. A rod connects the crank of the axle F with a walking-beam, G, that is at e pivoted to the top of the frame D. The beam G is provided with handles $ff$ at the ends, so that when it is by the occupants of the car oscillated on its pivot e it will impart rotary motion in the desired direction to the wheel b, and thence to the axle E to propel the car. The crank-shaft F is hung in its bearings in such manner that it can slide thereon, and is by a joint, g, connected at one end with an elbow-lever, h, which is pivoted to the under side of the frame A. A hand-lever, i, is pivoted at j to the frame A, and connects with the belt-crank h, so that by swinging the lever i in one direction the shaft F will be moved in its bearings to carry the wheel b out of gear, while, when the lever i is swung in the other direction, the wheel b will be thrown into gear with the pinions.

Having thus described my invention, I claim as new and desire to secure by Letters Patent—

The crank-shaft F of a hand-car, connected by a joint, g, with a hand-lever, h, so that it may be laterally moved by a lever, i, in the manner described.

DANIEL M. HUNT.

Witnesses:
    DAVID F. S. WAYS,
    WM. H. CROSBY.